Patented Nov. 1, 1927.

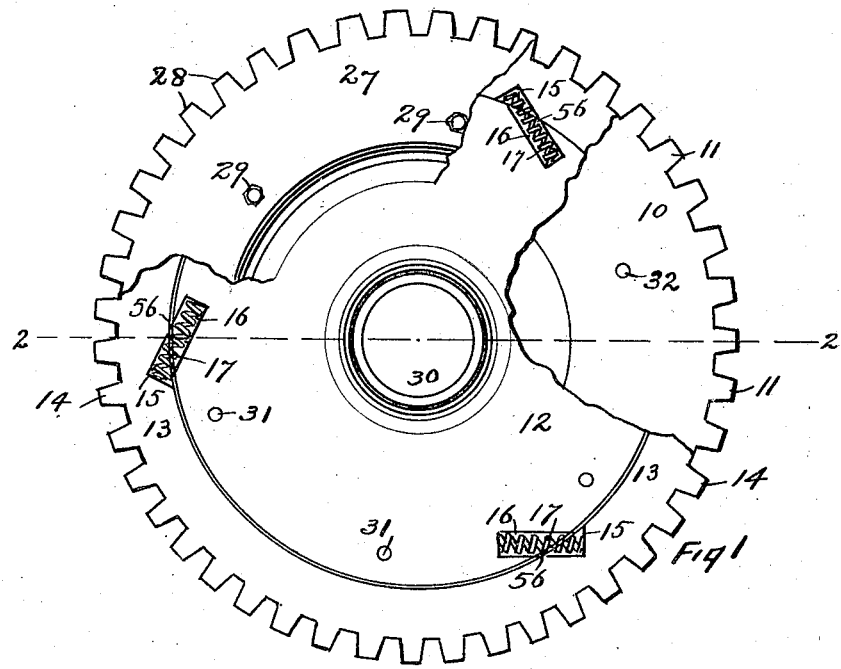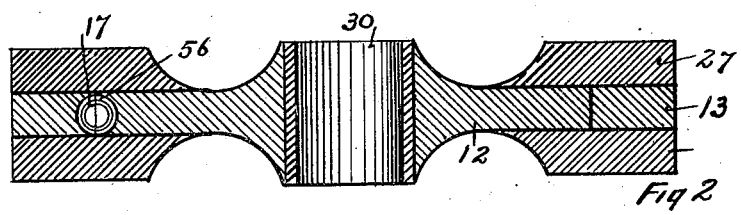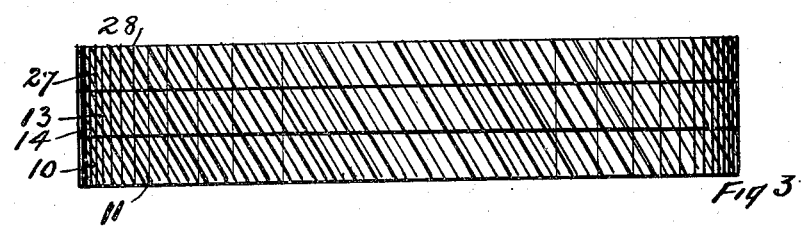

1,647,480

UNITED STATES PATENT OFFICE.

CLARENCE L. STARKEY, OF FRESNO, CALIFORNIA.

AUTOMATIC COMPENSATING GEAR.

Application filed May 20, 1927. Serial No. 193,035.

My invention relates to automatic compensating gears which are adapted to be used as timing gears in gas engines, and for other purposes where silent gears are preferable. On October 19th, 1926, U. S. Patent No. 1,604,105 was granted to me on an application filed May 1st, 1924, for a timing gear, and the invention for which I am now asking a patent is an improvement of the device disclosed in said specifications and drawing.

The object of my present improvement is an automatic compensating gear which will maintain a tension between the automatic compensating gear and an engaging gear so that the back lash of the gears when running together, and noises incident thereto, are eliminated. Other objects in my present invention are more simple construction so that the device can be manufactured at a low cost, a stronger gear than those of similar kinds used heretofore, less working parts, and the portion of the wheel between the hub and the rim can be reduced to thinner dimensions than in the gear described in my patent hereinbefore referred to. Other objects will be hereinafter disclosed.

These objects are accomplished by means of the device hereinafter described and illustrated on the accompanying drawing, in which Fig. 1 is a view of one of the faces of the automatic compensating gear with parts cut away to show the construction thereof. Fig. 2 is a sectional view of the gear along the line 2—2 in Fig. 1. Fig. 3 is a view of the wheel as viewed on the periphery.

Referring to the drawings, my device comprises a disc 10 provided around its outer periphery with a plurality of gear teeth 11. Disc 10 has a circular wheel center 12 concentric therewith which can be formed integral with disc 10, or rigidly attached thereto. The wheel center has the hub 22 therein. Revolvably mounted on the outer periphery of wheel center or hub 12 is a ring 13 of the same diameter as disc 10, which ring is provided on the outer periphery with a plurality of gear teeth 14 coinciding with gear teeth 11 on disc 10, and which teeth are adapted to register when the ring is assembled with disc 10 and hub 12. On the inner periphery of ring 13 are one or more recesses 15, and on the outer periphery of the hub 12 are an equal number of recesses 16 which are adapted, when the ring 13 is assembled with hub 12, to register with the recesses 15 so that the combination of the two recesses 15 and 16 will form an elongated slot 56, which slot can be shortened or lengthened slightly by the oscillations of the ring 13 on hub 12. Within each slot 56 is fitted a compression spring 17 adapted to normally hold the teeth 14 in advance of the teeth 11, the object being that when the automatic compensating gear is enmeshed with another gear, the ring 13 is moved back against the compression spring 17 to a point where the teeth 11 and the teeth 14 will register so that as the gears rotate together, spring 17 will force the teeth 14 to have a continual pressure against the teeth on the engaging gear.

A disc 27 of the same diameter as disc 10 is provided with a plurality of teeth 28 coinciding with the gear teeth 11. Disc 27 is fitted on the top of hub 12 and ring 13 so that the recesses 15 and 16 and the spring 17 are covered thereby. The teeth 28 should be aligned with the teeth 11, and the disc 27 should be firmly attached to the hub 12 and to the disc 10. This can be done by cap screws 29 as shown, or by any other suitable manner. The holes in the hub designated 31, and the hole in disc 10 designated 32, are adapted to receive the cap screws. It will be noted that the recesses 15 and 16 and the spring 17 can be made sufficiently small so that the wheel between the portion of the hub having the wheel center opening 30 and the rim of the wheel, the thickness of the wheel can be reduced as shown in Fig. 2. The teeth on discs 10 and 27 are the driving teeth. By the pressure of the teeth on ring 13 against the teeth in the driven gear in the opposite direction from the pressure of the driving teeth, back lash of the teeth is eliminated and the gears enmeshed function silently.

Having described my invention, I claim:

1. An automatic compensating gear consisting of two discs of equal diameters, each disc having a plurality of uniform teeth on the outside periphery, said discs being attached together a spaced distance apart, concentric and with the teeth on the two discs aligned, a circular member of less diameter than the discs attached to the discs concentric therewith and within the space between the assembled discs, a ring of equal outside diameter with the discs, having teeth on the outside periphery coinciding with the teeth on the discs, rotatably mounted on the circular member, recesses in the outside periphery of the circular member and in the inside periphery of the ring which jointly form elongated slots, resilient means within the slots which permit the teeth on the ring to yieldingly register and be aligned with the teeth on the discs.

2. An automatic compensating gear consisting of two discs of equal diameters, each disc having a plurality of uniform teeth on the outside periphery, said discs being attached together a spaced distance apart, concentric and with the teeth on the two discs aligned, a circular member of less diameter than the discs attached to the discs concentric therewith and within the space between the assembled discs, a ring of equal outside diameter with the discs, having teeth on the outside periphery coinciding with the teeth on the discs, rotatably mounted on the circular member recesses in the outside periphery of the circular member and in the inside periphery of the ring which jointly form elongated slots, a compression spring within the slot one end of which bears against the recess in the ring, and the other end of which bears against the circular member, said assembly permitting the ring to be positioned against the pressure of the spring so that the teeth of the ring and of the discs are aligned.

CLARENCE L. STARKEY.